United States Patent
Bauer et al.

(10) Patent No.: US 8,135,513 B2
(45) Date of Patent: Mar. 13, 2012

(54) VERTICAL ALIGNMENT OF A LIDAR SENSOR

(75) Inventors: Jochen Bauer, Lindau (DE); Ludwig Ertl, Bad Abbach/Peising (DE)

(73) Assignee: Continental Automotive GmbH, Hannover (DE)

( * ) Notice: Subject to any disclaimer, the term of this patent is extended or adjusted under 35 U.S.C. 154(b) by 429 days.

(21) Appl. No.: 12/522,019

(22) PCT Filed: Dec. 27, 2007

(86) PCT No.: PCT/EP2007/064584
§ 371 (c)(1),
(2), (4) Date: Jul. 2, 2009

(87) PCT Pub. No.: WO2008/080951
PCT Pub. Date: Jul. 10, 2008

(65) Prior Publication Data
US 2009/0312906 A1    Dec. 17, 2009

(30) Foreign Application Priority Data
Jan. 4, 2007   (DE) .......................... 10 2007 001 103

(51) Int. Cl.
*G01S 7/497*    (2006.01)
(52) U.S. Cl. ............................ 701/36; 701/225; 340/937
(58) Field of Classification Search ..................... 701/17, 701/33, 36, 117, 223, 225; 348/113–119, 348/148–155; 340/937
See application file for complete search history.

(56) References Cited

U.S. PATENT DOCUMENTS

| | | | |
|---|---|---|---|
| 6,026,353 A | 2/2000 | Winner | |
| 6,611,744 B1* | 8/2003 | Shimazaki et al. | 701/41 |
| 6,704,653 B2* | 3/2004 | Kuriya et al. | 701/301 |
| 7,230,640 B2 | 6/2007 | Regensburger et al. | |
| 2002/0138223 A1 | 9/2002 | Schneider et al. | |
| 2002/0169537 A1 | 11/2002 | Regensburger et al. | |
| 2003/0093220 A1 | 5/2003 | Andersson et al. | |
| 2004/0080450 A1 | 4/2004 | Cheong | |

FOREIGN PATENT DOCUMENTS

| | | |
|---|---|---|
| DE | 19536000 A1 | 4/1997 |
| DE | 19650863 C1 | 4/1998 |
| DE | 10114932 A1 | 10/2002 |
| DE | 10316101 A1 | 5/2004 |
| WO | 0075686 A1 | 12/2000 |
| WO | 0179879 A1 | 10/2001 |

* cited by examiner

*Primary Examiner* — Richard M. Camby
(74) *Attorney, Agent, or Firm* — Laurence A. Greenberg; Werner H. Stemer; Ralph E. Locher

(57) ABSTRACT

An analysis unit for a driver assistance system for a vehicle includes an input for receiving image information which is captured by a camera, a calculating device for using image information to calculate a variable which describes an angle of inclination of the vehicle, a determining device for using the variable to determine an output signal, wherein the output signal relates to a vertical orientation of electromagnetic radiation which is to be emitted by a transmitter unit, and an output for outputting the output signal. A driver assistance system, a computer program product and a method for operating a driver assistance system, are also provided.

12 Claims, 3 Drawing Sheets

VERTICAL ALIGNMENT OF A LIDAR SENSOR

BACKGROUND OF THE INVENTION

Field of the Invention

The invention relates to an analysis unit for a driver assistance system for a vehicle, said analysis unit having an input for receiving image information that is captured by a camera.

The term driver assistance system (or ADAS: Advanced Driver Assistance System) refers to a combination of functions which are designed to provide support to the driver of a motor vehicle. Often the aim of the driver assistance system is to increase safety by avoiding hazardous situations before they arise and by helping the driver to avoid accidents in critical situations. Further aims are to increase comfort by reducing stress and relieving the load on the driver under normal conditions, to aid orientation by means of environmental information, this being processed according to the situation and being communicated to the driver in an appropriate manner, and to increase driving enjoyment.

Examples of driver assistance functions include traction control, ABS (anti-lock braking system), ASR (anti-slip control), ESC (electronic stability control), EDS (electronic differential-lock system), adaptive directional headlights, automatic high-/low-beam switching, night vision systems, cruise control, parking distance control, assisted braking, ACC (adaptive cruise control), proximity warning, assisted turning, traffic congestion assistant, lane recognition system, lane holding assistant, lane holding support, lane change support, ISA (intelligent speed adaption), AEB (automatic emergency braking), tire pressure monitoring, driver drowsiness detection, traffic sign recognition, platooning.

BRIEF SUMMARY OF THE INVENTION

The object of the invention is to disclose an efficient analysis unit for a driver assistance system, as well as a corresponding computer program product and a method for operating a driver assistance system.

This object is achieved by an analysis unit for a driver assistance system for a vehicle, comprising an input for receiving image information that is captured by a camera, calculation means for calculating at least one variable with reference to the image information, said variable describing an angle of inclination of the vehicle, determining means for determining an output signal with reference to the at least one variable, said output signal relating to a vertical alignment of electromagnetic radiation that is to be emitted by a transmitter unit, and an output for outputting the output signal. This object is achieved as well as by a computer program product for a driver assistance system for a vehicle, comprising calculation means for calculating at least one variable with reference to the image information, said variable describing an angle of inclination of the vehicle, determining means for determining an output signal with reference to the at least one variable, the output signal relating to a vertical alignment of electromagnetic radiation that is to be emitted by a transmitter unit, output means for outputting the output signal. This object is further achieved by a method for operating a driver assistance system for a vehicle, wherein image information recorded by a camera is received, at least one variable describing an angle of inclination of the vehicle is calculated with reference to the image information, an output signal is determined with reference to the at least one variable, the output signal relating to a vertical alignment of electromagnetic radiation that is to be emitted by a transmitter unit. Advantageous embodiments and developments are the subject matter of dependent claims.

The inventive analysis unit for a driver assistance system for a vehicle has an input for receiving image information that is captured by a camera, and calculation means for calculating at least one variable with reference to the image information, said variable describing an angle of inclination of the vehicle. Also provided are determining means for determining an output signal with reference to the at least one variable, the output signal relating to a vertical alignment of electromagnetic radiation that is to be emitted by a transmitter unit, and an output for outputting the output signal.

Using image information, the analysis unit calculates one or more variables which relate to an angle of inclination of the vehicle. The variable relating to the angle of inclination is therefore derived from an observation of the environment of the vehicle. The angle of inclination refers to a reference variable such as e.g. the plane of the roadway or the inclination of another vehicle. The inclination described by the variable is preferably an inclination of the vehicle in a vertical direction or, as the case may be, a rotation parallel to the lateral axis of the vehicle, and hence in that dimension in which the transmitter unit or, as the case may be, the electromagnetic radiation that is to be emitted by the transmitter unit, must be aligned according to the output signal.

The variable (or variables) relating to the angle of inclination is (are) used for determining an output signal which relates to the vertical alignment of electromagnetic radiation that is to be emitted by the transmitter unit. In this case it is possible for the output signal to be determined exclusively from the at least one angle-of-inclination variable, or for other variables to have an influence in determining the output signal. In this case the vertical alignment preferably refers to the reference system of the vehicle; a movement in a vertical direction in this case means a movement which is perpendicular to the plane of the roadway surface in this case. Such a vertical alignment is preferably effected by means of a rotation of the transmitter unit parallel to the lateral axis of the vehicle.

The output signal can be used to control the vertical alignment of the electromagnetic radiation. The analysis unit preferably sends the output signal to a corresponding component which is responsible for the control or alignment of the transmitter unit, e.g. to an electric motor. Following alignment of the transmitter unit in accordance with the output signal, the transmitter unit can emit in the relevant direction. Alternatively, it is possible for the transmitter unit not to emit, but merely to be aligned for emitting in the relevant direction, such that an emission can take place if necessary.

In a development of the invention, the calculation means are embodied such that the at least one variable is calculated with reference to roadway markings and/or roadway limits which are represented in the image information. In this context, roadway markings comprise markings for separating different traffic lanes, or markings for indicating the roadway edge. Roadway limits are in this case e.g. the edge of the roadway asphalt or objects which are located at the edge of the roadway, such as posts or guard rails. The calculation means are preferably embodied in such a way that a road course is calculated with reference to the represented roadway markings and/or roadway limits, and the at least one variable is calculated with reference to the road course. In this case the road course can indicate the vertical and/or horizontal curvature of the roadway, depending on the distance from the vehicle.

It is particularly advantageous if the calculation means are embodied such that the at least one variable is calculated with reference to another vehicle which is represented in the image information. This allows the alignment of the radiation emitted by the transmitter unit to be adapted to the other vehicle. In this case the at least one variable can comprise an angle of inclination of the vehicle relative to the other vehicle. Furthermore, the at least one variable can comprise an angle of inclination of the vehicle relative to a connection line between the vehicle and the other vehicle. As an alternative to using a represented vehicle it is possible to perform the calculation of the at least one variable without a vehicle being represented in the image information.

According to a development of the invention, the at least one variable comprises a pitch angle of the vehicle. In this context, the pitch angle describes an inclination of the vehicle relative to its lateral axis, the lateral axis running parallel to the plane of the roadway when the roadway is level.

In an embodiment of the invention, the transmitter unit is part of a system for determining distance, e.g. a lidar system.

The calculation means can be embodied such that the at least one variable is calculated with reference to information which is captured by a tilt sensor. In this case measurements of a tilt sensor are taken into account in addition to the image information when the at least one variable is calculated.

The driver assistance system according to the invention comprises an analysis unit, the camera and the transmitter unit for electromagnetic radiation. In addition, means are preferably provided for determining the distance from another vehicle with the aid of the transmitter unit, and means are provided for controlling a distance from the other vehicle, e.g. for the purpose of maintaining a constant distance from the other vehicle.

The computer program product according to the invention comprises calculation means for calculating at least one variable with reference to the image information, said variable describing an angle of inclination of the vehicle, determining means for determining an output signal with reference to the at least one variable, the output signal relating to a vertical alignment of electromagnetic radiation that is to be emitted by a transmitter unit, and output means for outputting the output signal. In the context of the present invention, in addition to the actual computer program (with its technical effect extending beyond the normal physical interaction between program and processing unit), a computer program product can be understood to mean in particular a recording medium for the computer program, a set of files, a configured processing unit, and also e.g. a storage device or a server on which files belonging to the computer program are stored.

According to the inventive method, image information recorded by a camera is received, at least one variable describing an angle of inclination of the vehicle is calculated with reference to the image information, and an output signal is determined using the at least one variable, the output signal relating to a vertical alignment of electromagnetic radiation that is to be emitted by a transmitter unit.

The inventive computer program product and the inventive method are suitable in particular for the inventive analysis unit, this also being applicable to the embodiments and developments. For that purpose they can comprise further suitable means or steps.

BRIEF DESCRIPTION OF THE SEVERAL VIEWS OF THE DRAWING

The invention is described in more detail below with reference to an exemplary embodiment, in which.

DESCRIPTION OF THE INVENTION

Figure 1:
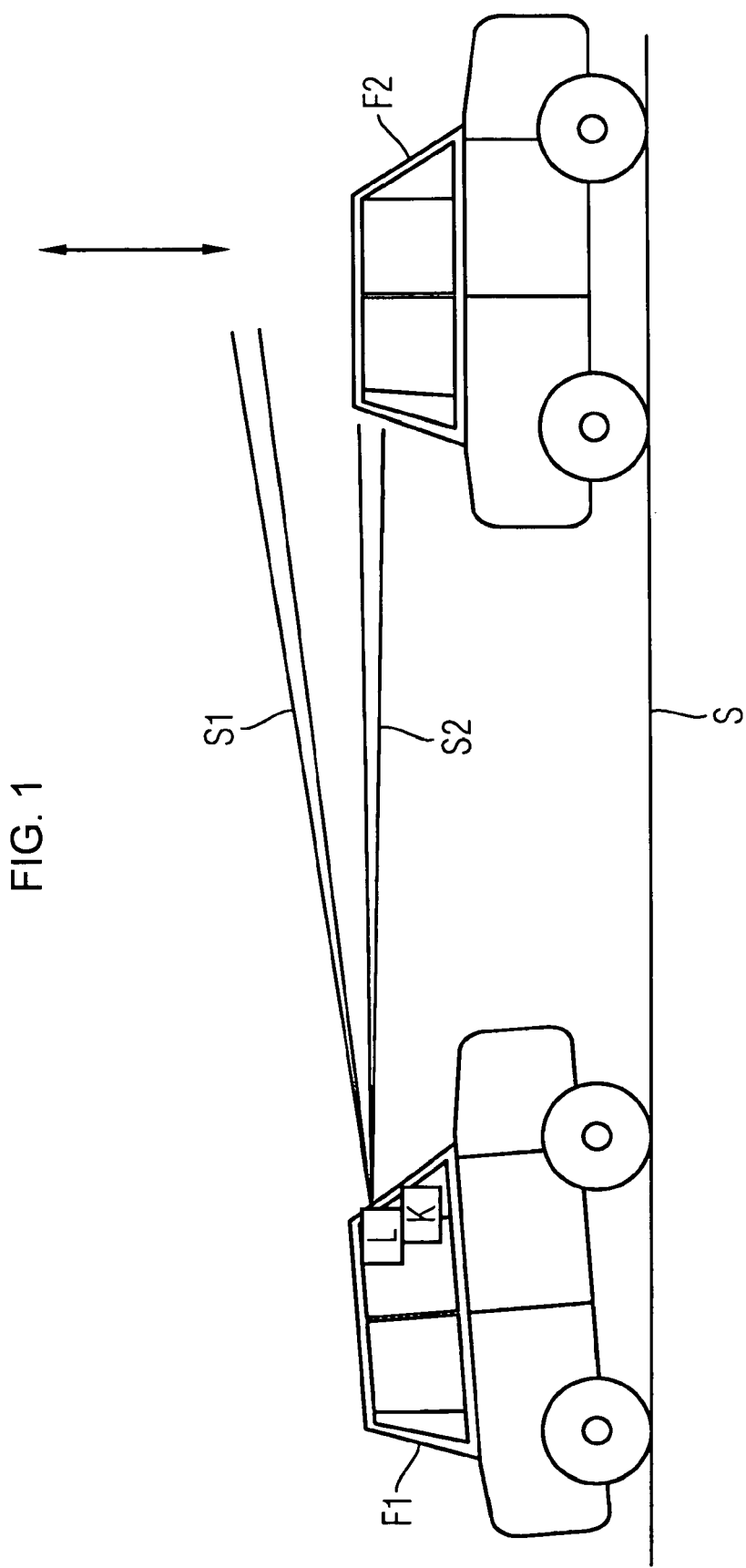
FIG. 1 shows two vehicles.

FIG. 1 shows the two vehicles F1 and F2, which are situated one behind the other on a road S. The vehicle F1 has a driver assistance system with the driver assistance function ACC, which is intended to control the distance from the preceding vehicle F2. For this purpose the distance between the vehicles F1 and F2 is determined by a lidar sensor L of the vehicle F1. In this arrangement the lidar sensor L is attached on the inside of the windshield of the vehicle F1; it transmits a laser beam in a forward direction and receives the laser beam that is reflected by the vehicle F2. The round-trip time between the sending of the laser signal and the reception of the reflected laser signal is determined, and provides a measure for the distance of the vehicle F2 from the vehicle F1.

FIG. 1 shows two laser beams S1 and S2 of the lidar sensor L, which differ in terms of their vertical alignment. The vertical alignment, in this context, is understood to mean the alignment perpendicular to the surface of the road S and is indicated by a dual-headed arrow in FIG. 1. Whereas the laser beam S2 strikes the vehicle F2 and consequently allows the distance between the vehicles F1 and F2 to be determined, the beam S1 is emitted so high in the vertical direction that the beam S1 does not reach the vehicle F2. The vertical alignment of the lidar sensor L is therefore very important with regard to the possibility of determining a distance from a preceding vehicle. In particular, incorrect alignment of the lidar sensor L becomes increasingly important as the distance from the preceding vehicle F2 increases.

Figure 2:
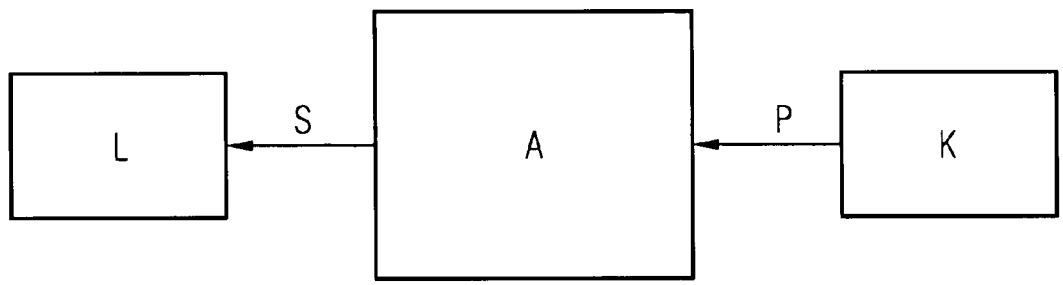
FIG. 2 shows an extract from a driver assistance system of a vehicle.

The driver assistance system of the vehicle F1 has a video camera K which records the space in front of the vehicle F1. The camera K can be installed on the inside of the windshield of the vehicle F1, for example, in the same way as the lidar sensor L. The camera K supplies the images P that it captures to an analysis unit A which is illustrated in FIG. 2. Using the images P, the analysis unit A calculates a control signal S which is used for setting the vertical alignment of the lidar sensor L. To that end, an electric motor is provided which can change the vertical alignment of the lidar sensor L with reference to the control signal S.

Figure 3:
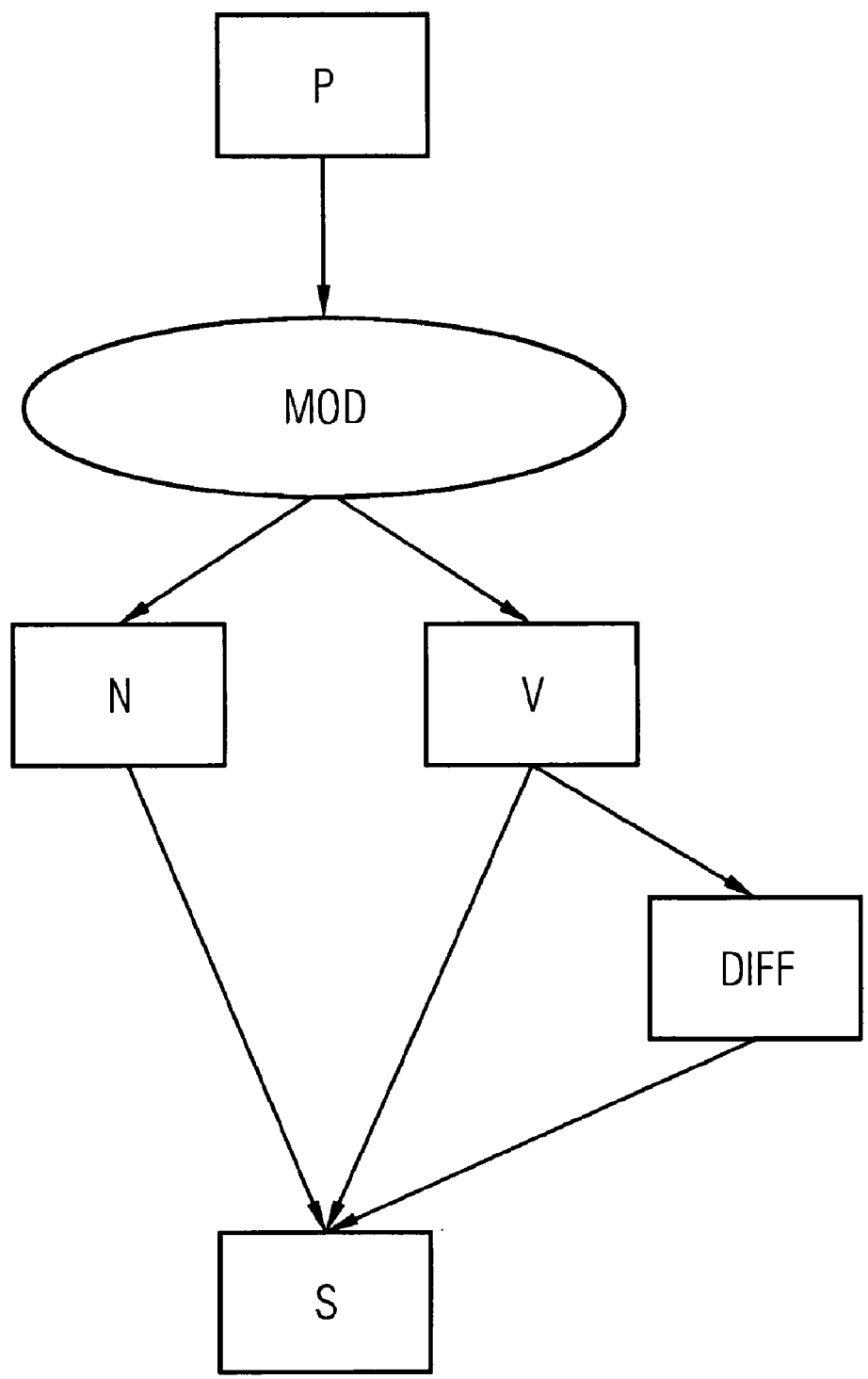
FIG. 3 shows a flow diagram.

FIG. 3 shows a flow diagram to illustrate the calculation of the control signal S by the analysis device A using the images P. For this purpose, use is made of a roadway model MOD with parameters which correspond at least, inter alia, to the pitch angle of the vehicle F1 and to the vertical and horizontal curvature of the roadway. The parameters are adapted until the road course which is calculated with reference to said adapted parameters corresponds as closely as possible to the road course that is recorded by the camera. In order to check the correspondence, consideration is preferably given to the roadway markings; alternatively, the edge of the roadway can be considered, the latter being relevant in particular if the roadway is covered in snow. The aforementioned parameters are output as a result, such that the pitch angle N of the vehicle F1 and the road course V are determined. In this context the road course V indicates the extent of the horizontal and vertical curvature of the road as a function of the distance from the vehicle F1. Such a calculation of pitch angle and roadway course using a roadway model is described e.g. in E. D. Dickmanns, B. D. Mysliwetz: "3-D road and relative ego-state estimation", IEEE Transactions on PAMI, 14(2), pages 199-213, February 1992.

First to be considered is the situation in which the camera K does not capture a preceding vehicle F2. A suitable vertical alignment of the lidar sensor L is still beneficial in this situation, because a correctly aligned lidar sensor L can capture a newly appearing preceding vehicle F2 more quickly and thus determine the distance from this vehicle. In this way the driver assistance function ACC can be utilized more swiftly, as soon as a visible preceding vehicle F2 is present.

The control signal S can be calculated using the pitch angle N alone. The pitch angle N describes the inclination of the vehicle F1 relative to its lateral axis, the lateral axis of the vehicle F1 in FIG. 1 pointing into the plane of projection. The pitch angle W can change e.g. due to the loading, the occupancy of the vehicle seats, different tire pressures, roadway unevenness, acceleration, braking or rocking of a vehicle. The control signal S is determined in such a way that the pitch angle N of the vehicle F1 is equalized. This means that the lidar sensor L is aligned parallel to the road in the vertical direction. If the vehicle F1 is inclined toward the rear as shown in FIG. 1 due to heavy loading of the trunk, for example, the lidar sensor L should be aligned downward to a greater extent than in the state where the trunk is not loaded.

In addition to the pitch angle N, the road course V can also be taken into account when calculating the control signal S. An alignment of the lidar sensor L parallel to the road in a vertical direction as explained above is beneficial in particular when the vertical gradient of the road is constant, this applying to both a level road course and a positive or negative gradient. If the gradient in front of the vehicle F1 increases, however, it is advantageous to align the lidar sensor L slightly upward in comparison with the parallel alignment. Correspondingly, if the gradient in front of the vehicle F1 decreases, it is favorable to align the lidar sensor L downward to a somewhat greater degree in comparison with the parallel alignment. The case in which the vehicle F1 traverses a hilltop or a valley is a particularly good illustration of this. Any roadway gradient increase or decrease is therefore derived from the road course V, and the parallel alignment of the lidar sensor L, which is achieved by equalizing the pitch angle N, is altered accordingly.

Until now, the control signal S was calculated on the basis of the images P, on the assumption that no preceding vehicle F2 was captured by the camera K. However, if a preceding vehicle F2 is contained in the images P, it is possible to determine the angle of inclination DIFF of the vehicle F1 relative to the straight line connecting the vehicles F1 and F2. If the lidar sensor L is located at the same vertical position as the camera K, the control signal S can be derived directly from this relative angle of inclination DIFF. If, on the other hand, the lidar sensor L is not located at the same vertical position as the camera K, the control signal S can be calculated on the basis of trigonometry with reference to the distance between the vehicles F1 and F2. In this case an estimate which is calculated from the image that is captured by the camera K can be used as a measure for the distance. It is advantageous in this case that the requirements with regard to accuracy of the estimate are modest.

As an alternative to the variable DIFF explained above, the difference in the gradients of the two vehicles F1 and F2 can be used as variable DIFF. This difference DIFF is determined with reference to the road course V. Since the road course V has been calculated, and the position at which the vehicle F2 is located on the road course V is also known from the images P, it is possible to establish the current vertical roadway gradient at which the vehicle F2 is located. It is also possible to derive the current vertical roadway gradient of the vehicle F1 from the road course V, such that the difference DIFF between these two values can be determined. If the two gradients are equal, e.g. if the two vehicles F1 and F2 are traveling along a level section of road as illustrated in FIG. 1, or if the two vehicles F1 and F2 are traveling up an incline with a constant gradient, the control signal S is determined such that the lidar sensor L is aligned parallel to the road. However, if the current gradient of the preceding vehicle F2 is greater than that of the vehicle F1, the lidar sensor L should be aligned higher. Conversely, the opposite applies if the current gradient of the preceding vehicle F2 is smaller than that of the vehicle F1.

In addition to the difference DIFF in the gradients of the two vehicles F1 and F2, the pitch angle N of the vehicle F1 is also taken into account. For although a relative inclination of the vehicles F1 and F2 can be determined with reference to the road course V, said inclination being derived from the gradient course of the road, the actual relative inclination is nonetheless derived from the difference DIFF and the pitch angle N. In this case the pitch angle can increase or decrease the gradient difference DIFF, depending on the direction in which the vehicle F1 is inclined as a result of the pitch angle N.

As an alternative to the previous embodiment, according to which the pitch angle was calculated from the images P of the camera K, it is also possible to obtain the pitch angle via a pitch angle sensor. A pitch angle sensor may be provided for other vehicle components, e.g. for the ESC system or the headlights. The measurement results of the pitch angle sensor can also be used in addition to the pitch angle N that is calculated with reference to the roadway model MOD, e.g. by using a pitch angle value that is calculated from the two values.

The invention claimed is:

1. An analysis unit for a driver assistance system for a vehicle having a camera and a transmitter unit, the analysis unit comprising:
  an input for receiving image information captured by the camera;
  a calculating device for calculating at least one variable with reference to another vehicle represented in the image information, the variable describing an angle of inclination of the vehicle;
  a determining device for determining an output signal with reference to the at least one variable, the output signal relating to a vertical alignment of electromagnetic radiation to be emitted by the transmitter unit; and
  an output for outputting the output signal.

2. The analysis unit according to claim 1, wherein said calculating device calculates the at least one variable with reference to roadway markings and/or roadway limits represented in the image information.

3. The analysis unit according to claim 2, wherein said calculating device calculates a road course with reference to the represented roadway markings and/or roadway limits, and the at least one variable is calculated with reference to the calculated road course.

4. The analysis unit according to claim 1, wherein the at least one variable includes an angle of inclination of the vehicle relative to the other vehicle.

5. The analysis unit according to claim 1, wherein the at least one variable includes an angle of inclination of the vehicle relative to a connection line between the vehicle and the other vehicle.

6. The analysis unit according to claim 1, wherein the at least one variable includes a pitch angle of the vehicle.

7. The analysis unit according to claim 1, wherein the transmitter unit is part of a system for determining distance.

8. The analysis unit according to claim 1, wherein said calculating device calculates the at least one variable with reference to information captured by a tilt sensor.

9. A driver assistance system for a vehicle, the driver assistance system comprising:
   the analysis unit according to claim 1, the camera and the transmitter unit.

10. The driver assistance system according to claim 9, which further comprises a device for determining a distance from another vehicle with the aid of the transmitter unit, and a device for controlling the distance from the other vehicle.

11. A computer program stored on a computer-readable medium for a driver assistance system for a vehicle, the computer program executable to perform the following steps:
   calculating at least one variable with reference to another vehicle represented in image information, the variable describing an angle of inclination of the vehicle;
   determining an output signal with reference to the at least one variable, the output signal relating to a vertical alignment of electromagnetic radiation to be emitted by a transmitter unit; and
   outputting the output signal.

12. A method for operating a driver assistance system for a vehicle, the method comprising the following steps:
   receiving image information recorded by a camera;
   calculating at least one variable describing an angle of inclination of the vehicle with reference to another vehicle represented in the image information; and
   determining an output signal with reference to the at least one variable, the output signal relating to a vertical alignment of electromagnetic radiation to be emitted by a transmitter unit.

* * * * *